(12) United States Patent
Naito

(10) Patent No.: US 6,557,904 B2
(45) Date of Patent: May 6, 2003

(54) TUBE JOINT

(75) Inventor: Keiichirou Naito, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/982,870

(22) Filed: Oct. 22, 2001

(65) Prior Publication Data

US 2002/0047266 A1 Apr. 25, 2002

(30) Foreign Application Priority Data

Oct. 23, 2000 (JP) ........................................ 2000-322936

(51) Int. Cl.[7] ................................................ F16L 37/08
(52) U.S. Cl. ...................... 285/316; 285/319; 285/307; 251/149.6
(58) Field of Search ................................. 285/319, 316, 285/307

(56) References Cited

U.S. PATENT DOCUMENTS

| | | | |
|---|---|---|---|
| RE23,120 E | * 6/1949 | Earle et al. ................... 285/277 |
| 4,007,909 A | * 2/1977 | Buseth et al. ............. 251/149.2 |
| 4,481,977 A | 11/1984 | Maldavs | |
| 5,305,984 A | * 4/1994 | Chen ...................... 251/149.1 |
| 5,390,962 A | * 2/1995 | Sekiguchi et al. ............ 285/53 |
| 6,065,779 A | * 5/2000 | Moner et al. ................. 285/23 |
| 6,283,443 B1 | 9/2001 | Teneya | |

FOREIGN PATENT DOCUMENTS

EP 1 033 522 9/2000

OTHER PUBLICATIONS

NOTE: The above documents were cite in a corresponding application in Germany, in an official communication dated Apr. 8, 2002. A copy of the German Patent Office communication is attached.
U.S. patent application Ser. No. 10/115,993 by Yoshimoto Taneya et al., filed on Apr. 5, 2002, status pending.

* cited by examiner

Primary Examiner—Lynne H. Browne
Assistant Examiner—Giovanni Collins
(74) Attorney, Agent, or Firm—Paul A. Guss (57) ABSTRACT

A tube joint comprises a first tube joint member; a second tube joint member joined to the first tube joint member; a sleeve attached to a joining portion of the first and second tube joint members, for joining and releasing the first and second tube joint members; a resilient member for urging the sleeve in the direction to join the first and second tube joint members to one another; and a protecting member for protecting the sleeve.

13 Claims, 6 Drawing Sheets

TUBE JOINT

BACKGROUND OF THE INVENTION

1. Field of the Invention

The present invention relates to a tube joint. Specifically, the present invention relates to a tube joint functioning as protecting a joining portion of the tube joint from an external force.

2. Description of the Related Art

Figure 6:
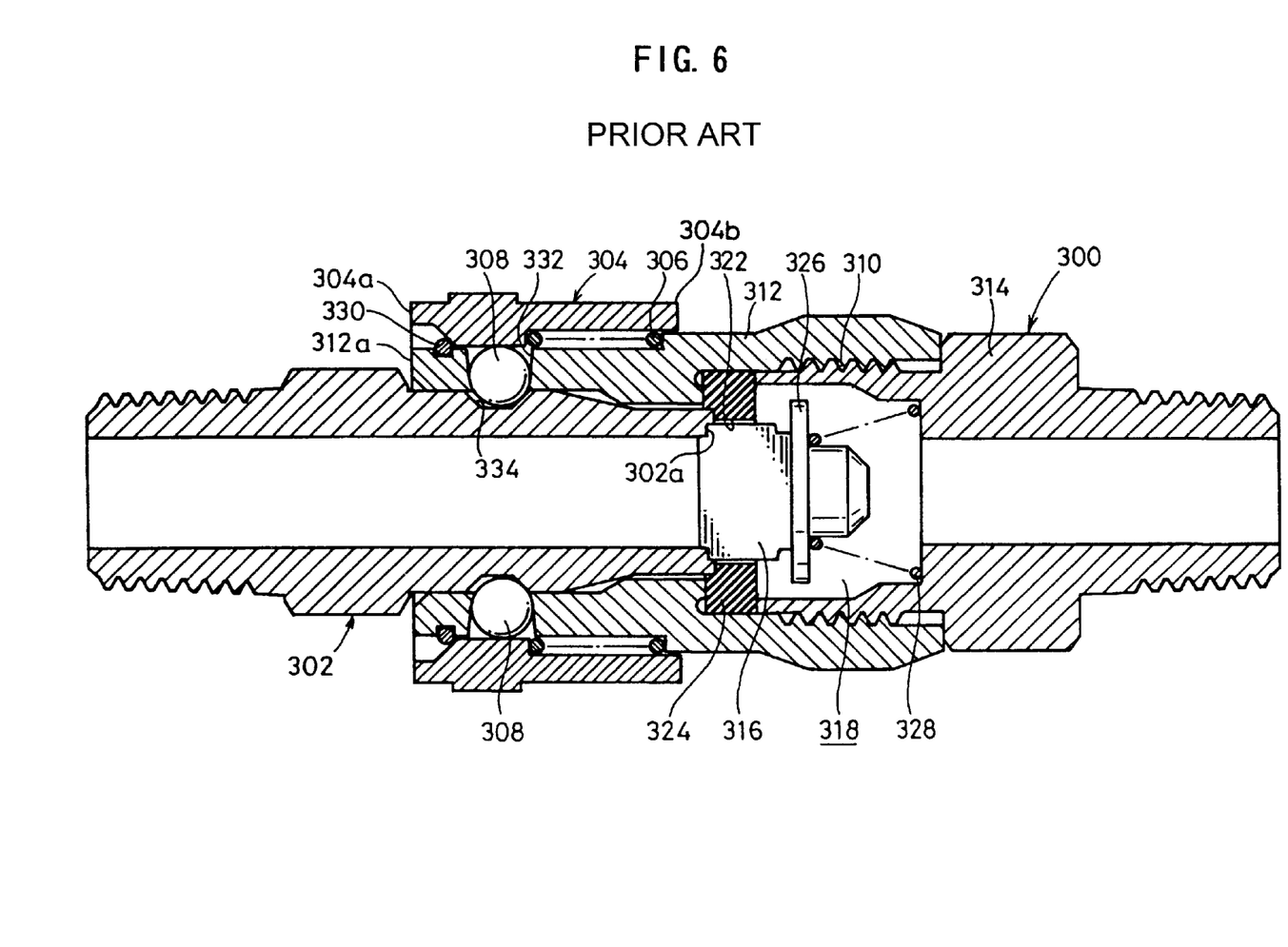
FIG. 6 is a longitudinal sectional view illustrating an arrangement of a conventional tube joint.

As shown in FIG. 6, a conventional tube joint generally comprises a tubular first tube joint member 300, a tubular second tube joint member 302 which is joined to the first tube joint member 300, a sleeve 304 which is attached to a joining portion of the first and second tube joint members 300, 302 and which functions to join and release the first and second tube joint members 300, 302, a compressive coil spring 306 which urges the sleeve 304 in the direction to join the first and second tube joint members 300, 302 to one another, and a plurality of ball members 308 which function to engage the first and second tube joint members 300, 302 with each other.

The first tube joint member 300 comprises a cylindrical member 312 which has its front to be inserted into the sleeve 304 and its rear formed with a female thread 310, and a cylindrical joining member 314 to be screwed into the female thread 310 of the cylindrical member 312. An accommodating space 318 for accommodating a valve plug 316 is formed at a front of the joining member 314. A closing plate 324 having a slit 322 for inserting a part of the valve plug 316 therethrough is installed between the cylindrical member 312 and the joining member 314. A compressive coil spring 328 is inserted into the accommodating space 318 in order that the valve plug 316 is constantly urged in the direction toward the closing plate 324 to close the slit 322 with a flange 326 of the valve plug 316.

The sleeve 304 is installed so that its end surface 304a can be flushed with an end surface 312a of the cylindrical member 312 of the first tube joint member 300. The sleeve 304 is always resiliently urged by the compressive coil spring 306 in the direction to make separation from the first tube joint member 300 toward the second tube joint member 302. However, the sleeve 304 is prevented from disengaging from the first tube joint member 300 by a ring-shaped stopper member 330 installed near the end surface 312a of the cylindrical member 312.

The cylindrical member 312 of the first tube joint member 300 has a plurality of holes 332 which are formed at positions of equal intervals in the circumferential direction of the cylindrical member 312 at a front end of the cylindrical member 312 (portion to overlap the second tube joint member 302). Each of the holes 332 has a diameter which is gradually reduced in the direction toward the central axis of the cylindrical member 312, and each of the ball members 308 is inserted into each of the holes 332. A part of the ball member 308 is inserted into and engaged with an annular groove 334 formed on the surface of the second tube joint member 302 when the second tube joint member 302 is inserted into the hollow of the cylindrical member 312. FIG. 6 shows only two of the holes 332 and the ball members 308 respectively.

Usually, the ball members 308 are pressed by the sleeve 304 in the direction toward the central axis of the cylindrical member 312. However, the ball members 308 are released from the pressing action of the sleeve 304 when an external force is applied to the sleeve 304 to move the sleeve 304 toward the joining member 314 in the axial direction of the tube joint member 300. At this time, the flange 326 of the valve plug 316 abuts against the closing plate 324 by being urged by the compressive coil spring 328 to close the slit 322. The valve plug 316 is thus closed.

Thereafter, when the second tube joint member 302 is inserted into the hollow of the cylindrical member 312 of the first tube joint member 300, the valve plug 316 is moved rearwardly against the urging action of the compressive coil spring 328 by the end surface of the second tube joint member 302. The valve plug 316 is thus opened.

When the external force having been applied to the sleeve 304 is eliminated, the sleeve 304 is resiliently urged by the resilient restoration of the compressive coil spring 306, and the sleeve 304 is restored to the position where the end surface 304a of the sleeve 304 is flushed with the end surface 312a of the cylindrical member 312.

Then, the ball members 308 are pressed again by the sleeve 304 in the direction toward the central axis of the cylindrical member 312. As a result, the ball members 308 are engaged with the annular groove 334 provided on the second tube joint member 302.

As a result of the engagement of the ball members 308, it is impossible for the second tube joint member 302 to disengage from the first tube joint member 300. The first and second tube joint members 300, 302 are firmly joined to one another.

The sleeve 304 may be deformed if an impact force is applied to the sleeve 304 of the above tube joint. Specifically, the sleeve 304 tends to be deformed if it has a thin-walled structure.

If the sleeve 304 is thus deformed, it is impossible for the sleeve 304 to move in the axial direction of the first tube joint member 300. It is consequently impossible to join or disengage from the second tube joint member 302.

Specifically, the sleeve 304 has a thin-walled structure to reduce the weight of the conventional tube joint in some cases. The thin-walled sleeve 304 may be deformed if it receives the external impact force. For example, the portion near the end surface 304a of the sleeve 304 and the other end section 304b thereof may highly possibly receive the impact force.

The impact force referred to herein is an excessive force which is not caused insofar as the sleeve 304 is usually handled. The impact force is different from the external force to move the sleeve 304 as described above. Specifically, it is possible to assume the impact force caused if the sleeve 304 is struck by a tool or the like or caused if the sleeve 304 falls to the ground or the floor.

If the sleeve 304 is deformed by the impact force, it is impossible for the sleeve 304 to move in the axial direction of the first tube joint member 300. It is further impossible for the ball members 308 to engage with or to be inserted into the groove 334. Not only the sleeve 304 but also the ball members 308 and the compressive coil spring 306 may be deformed.

Accordingly, the first tube joint member 300 and the second tube joint member 302 cannot be correctly joined to or disengaged from each other.

The sleeve 304 may have a thick-walled structure to prevent the above problem from occurring. However, in this case, it is not preferable that the weight of the entire tube joint may increase.

SUMMARY OF THE INVENTION

It is an object of the present invention to provide a tube joint which has a light weight and which is not broken and deformed even by an impact force caused if the tube joint falls to the ground or the floor.

The present invention provides a tube joint comprising a first tube joint member; a second tube joint member joined to the first tube joint member; a sleeve member attached to a joining portion of the first and second tube joint members, for joining and releasing the first and second tube joint members; a resilient member for urging the sleeve member in the direction to join the first and second tube joint members to one another; and a protecting member for protecting at least the sleeve member.

According to the present invention, it is possible to protect the sleeve member from the impact force caused if the tube joint member falls to the ground or the floor.

Stated otherwise, according to the tube joint of the present invention, it is possible to protect the joining portion of the tube joint from the impact force by the first and second protecting members and a holder. Components of the tube joint such as the sleeve member and a coil spring are not broken and deformed.

The sleeve member can be thin-walled by adopting the protecting member. Then, the size of the tube joint can be minimized and the weight thereof can be light.

Preferably, the protecting member is provided at least at a portion where the sleeve member can axially move at a forward end thereof. The forward end of the sleeve member is in the direction of the joining portion of the first and second tube joint members.

Preferably, the protecting member is provided at least at a portion where the sleeve member can axially move at a rear end thereof. The rear end of the sleeve member is opposite to the direction of the joining portion of the first and second tube joint members.

Preferably, the protecting members are provided at least at portions where the sleeve member can axially move at both of a forward end and a rear end thereof respectively. The forward end of the sleeve member is in the direction of the joining portion of the first and second tube joint members and the rear end of the sleeve member is opposite to the forward end thereof.

Preferably, the tube joint further comprises an engagement section for engaging with the protecting member, the engagement section being disposed at the forward end of the sleeve member. It is easy to engage with the protecting member if the engagement section is a recess.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An illustrative embodiment of the tube joint according to the present invention will be explained below with reference to FIGS. 1 to 5.

Figure 1:
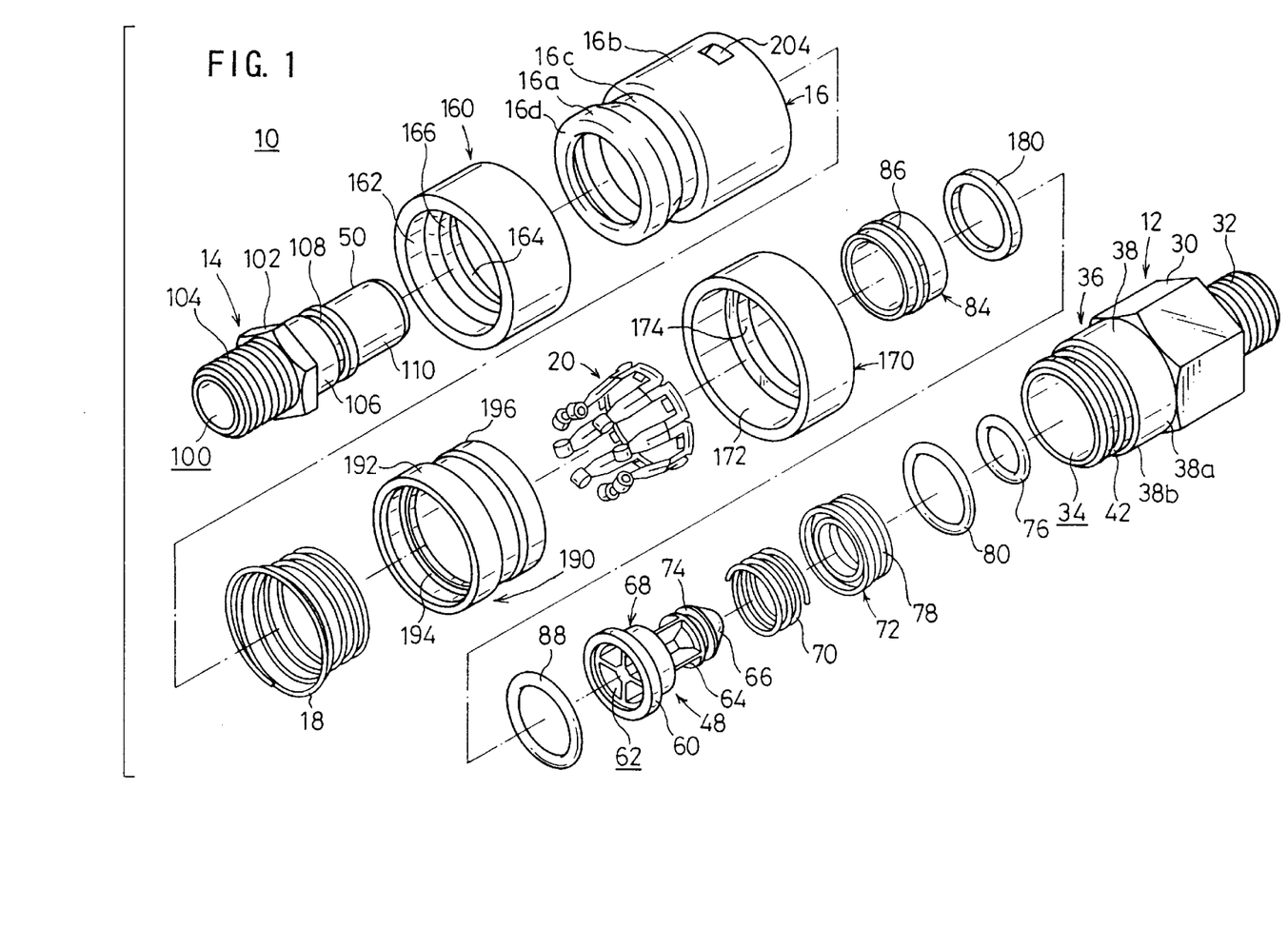
FIG. 1 is an exploded perspective view illustrating an arrangement of a tube joint according to an embodiment of the present invention.

As shown in FIG. 1, the tube joint 10 according to the embodiment of the present invention comprises a first tube joint member 12 made of metal, a second tube joint member 14 made of metal which is joined to the first tube joint member 12, a sleeve 16 made of metal which is attached to a joining portion of the first and second tube joint members 12, 14 and which joins and releases the first and second tube joint members 12, 14, a compressive coil spring 18 which urges the sleeve 16 in the direction to join the first and second tube joint members 12, 14 to one another, a chuck 20 which engages the first and second tube joint members 12, 14 with each other, a first protecting member 160 which is attached to the forward end of the sleeve 16, a second protecting member 170 which is forcibly inserted into the front of the first tube joint member 12, a holder 190 which is installed in the second protecting member 170 at the front of the first tube joint member 12 (as described later on), and an annular member 180 which is arranged to make abutment against the inner wall surface of the first tube joint member 12.

The direction is specifically assumed as follows in the following explanation. The portion of the first tube joint member 12 where the second tube joint member 14 is inserted is referred to as "front". The direction of the first tube joint member 12 toward the second tube joint member 14 as viewed from the first tube joint member 12 is referred to as "frontward direction or frontwardly". The portion of the second tube joint member 14 where the second tube joint member 14 is inserted into the first tube joint member 12 is referred to as "rear". The direction of the second tube joint member 14 toward the first tube joint member 12 as viewed from the second tube joint member 14 is referred to as "rearward direction rearwardly".

The first tube joint member 12 has its central section 30 of a hexagonal cylinder shape. A male thread is formed on a rear section 32 of the first tube joint member 12. The first tube joint member 12 functions as a bolt member having a hollow section 34. An unillustrated tube is connected to the male thread section 32. A front section 36 of the first tube joint member 12 includes a proximal section 38 which has a large outer diameter, and a small outer diameter section 42 which is disposed frontwardly as compared with the proximal section 38.

Figure 2:
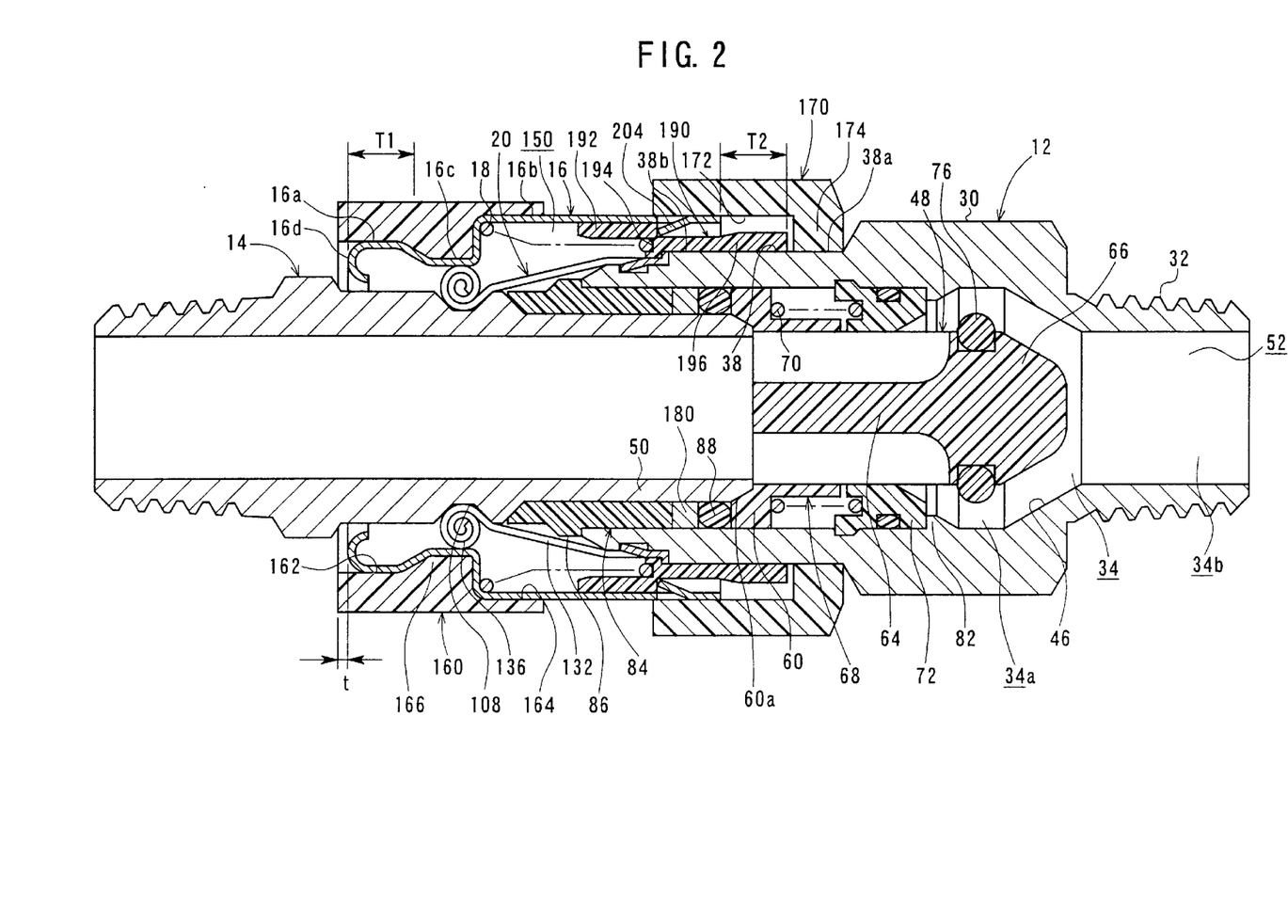
FIG. 2 is a longitudinal sectional view illustrating an arrangement of the tube joint according to the embodiment of the present invention, especially illustrating a state in which a second tube joint member is inserted into a first tube joint member.

As shown in FIG. 2, the first tube joint member 12 has the hollow section 34 which makes penetration in the axial direction. The space of the hollow section 34 is formed as an accommodating space 34a for inserting at least a valve plug 48 and a part of a rear section 50 of the second tube joint member 14 thereinto as described later on. The accommodating space 34a is formed over a range from the opening at the front end thereof to the portion corresponding to the start end of the male thread section 32. The space is formed as a through-hole 34b over a range from the start end of the male thread section 32 to the opening 52 at the rear of the hollow section 34.

The diameter of the accommodating space 34a is set to be larger than the diameter of the through-hole 34b. Specifically, a tapered surface 46 is formed between the accommodating space 34a and the through-hole 34b. The diameter of the tapered surface 46 gradually reduces toward the through-hole 34b.

As shown in FIG. 1, the valve plug 48 comprises a cylindrical base section 60, a support member 64 having a cross-shaped cross section and extending rearwardly from a hollow section 62 of the base section 60, a main valve body 68 which has a round projection 66 formed integrally with the main valve body 68 at the rear end of the support member 64, and a movable member 72 which is installed to the main valve body 68 by a compressive coil spring 70. All of these components are made of synthetic resin. An O-ring 76 is installed to an annular groove 74 disposed at a proximal portion of the projection 66 of the main valve body 68. An O-ring 80 is installed to an annular groove 78 disposed on the movable member 72.

Figure 3:
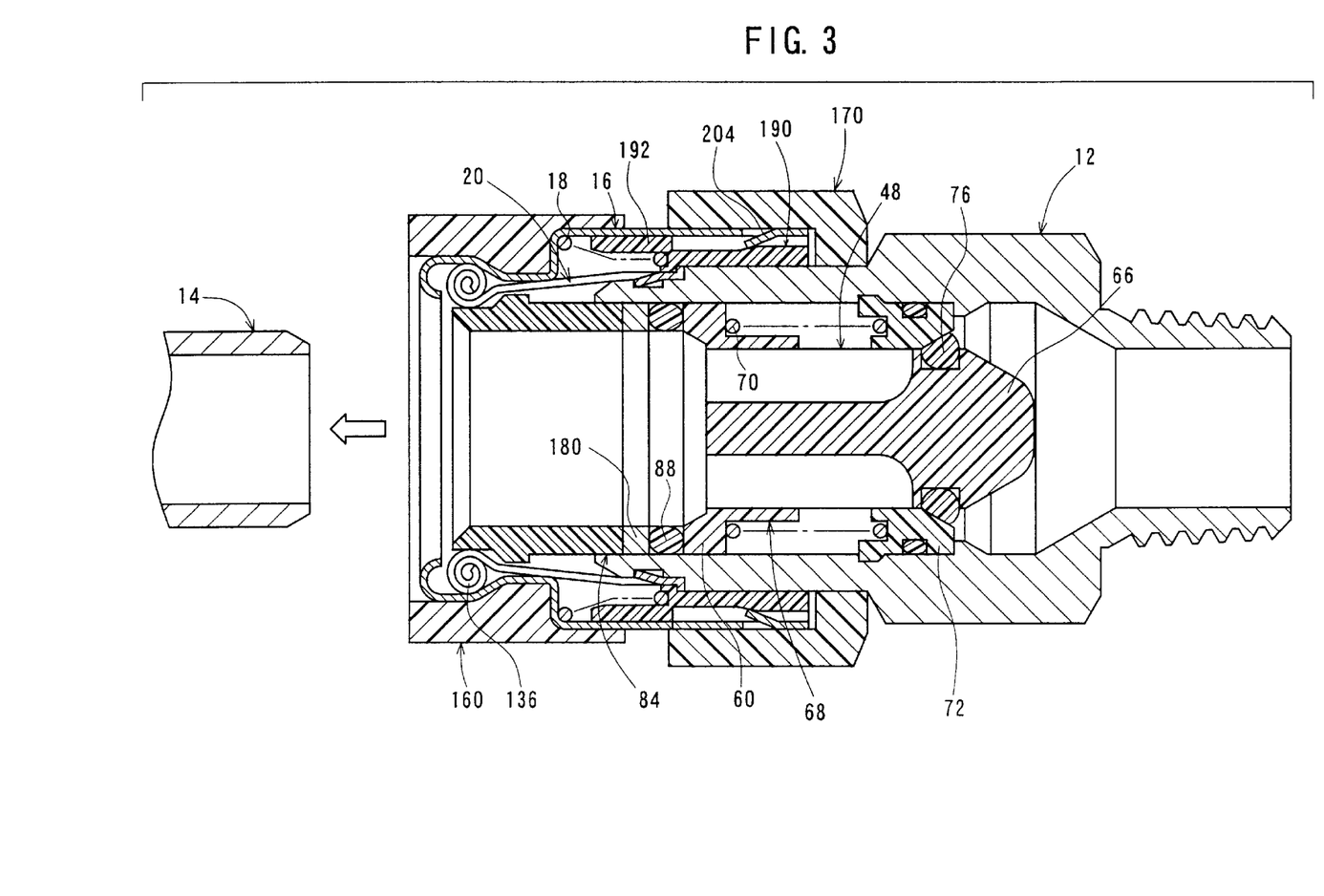
FIG. 3 is a longitudinal sectional view illustrating an arrangement of the tube joint according to the embodiment of the present invention, especially illustrating a state in which the second tube joint member is not inserted into the first tube joint member.

As shown in FIG. 3, in the natural state of the valve plug 48, the proximal portion of the projection 66 of the main valve body 68 and the inner wall at the rear end of the movable member 72 make mutual abutment, and they are pressed to one another with the O-ring 76 intervening therebetween under the resilient urging action of the compressive coil spring 70. The main valve body 68 and the movable member 72 are reliably kept sealed by the O-ring 76. Thus, the valve plug 48 is closed.

As shown in FIG. 2, when the base section 60 is relatively moved in the direction of approaching the movable member 72 against the urging action of the compressive coil spring 70, the proximal portion of the projection 66 is separated from the inner wall of the rear end of the movable member 72. Therefore, the space on the projection 66 and the space on the base section 60 are communicated with each other by the support member 64 to thereby open the valve plug 48.

The valve plug 48 thus constructed is forcibly inserted into the accommodating space 34a of the first tube joint member 12. The valve plug 48 is fitted into the accommodating space 34a with the main valve body 68 being movable frontwardly and rearwardly. The movable member 72 of the valve plug 48 is held against further forcible insertion in the direction toward the through-hole 34b by an annular projection 82 diposed on the inner wall of the accommodating space 34a.

A cylindrical collar member 84 is attached to the accommodating space 34a along the inner wall of the front end thereof. The collar member 84 has an annular projection 86 formed on the outer circumferential surface thereof. The annular projection 86 functions as a stopper when the collar member 84 is forcibly inserted into the first tube joint member 12.

An annular member 180 having a short axial length is provided to make abutment against the rear end surface of the collar member 84. The annular member 180 has its outer diameter which is set to be approximately the same as the inner diameter of the front section 36 of the first tube joint member 12. The inner diameter of the annular member 180 is set to be approximately the same as the outer diameter of the second tube joint member 14. The annular member 180 functions to protect the O-ring 88 intervening between the base section 60 and the rear end surface of the annular member 180 and the collar member 84 when the bending moment acts as an external force on the entire tube joint 10 with the first tube joint member 12 and the second tube joint member 14 being joined to one another.

In other words, the annular member 180 receives the compressive force applied to this portion by the bending moment to prevent the collar member 84 and the O-ring 88 from deforming. A metal of a large strength is desirably used as a material of the annular member 180. Specifically, stainless steel or the like is preferably used.

The annular member 180 and the base section 60 are reliably kept sealed by the O-ring 88.

The collar member 84 has its outer diameter which is set to be approximately the same as the inner diameter of the front section 36 of the first tube joint member 12. Therefore, when the collar member 84 is forcibly inserted into the opening of the front section 36 of the first tube joint member 12, the collar member 84 can be fitted to the first tube joint member 12.

As shown in FIG. 3, when the second tube joint member 14 is not inserted into the first tube joint member 12, the base section 60 of the main valve body 68 and the collar member 84 as well as the O-ring 88 and the annular member 180 intervening therebetween are displaced frontwardly under the urging action of the compressive coil spring 70. Plate spring sections 132 of the chuck 20 described later on are pressed in directions to mutually and outwardly develop by the front end of the collar member 84. At this time, the O-ring 76 provided for the projection 66 of the valve plug 48 abuts against the inner wall of the movable member 72 to thereby close the valve plug 48.

As shown in FIG. 1, a hollow section 100 which penetrates from the front end opening to the rear end opening is formed in the second tube joint member 14. The second tube joint member 14 functions as a bolt member having the hollow section 100. A central section 102 of the second tube joint member 14 is formed to have a hexagonal cylinder shape and a male thread is formed at its front section 104. An unillustrated tube is connected to the front section (male thread section) 104. An annular groove 108 is formed in the circumferential direction at a proximal section 106 having a large outer diameter of the rear section 50 of the second tube joint member 14.

A small outer diameter section 110 of the rear section 50 of the second tube joint member 14 has its outer diameter which is set to be approximately the same as the inner diameter of the collar member 84. The length of the small outer diameter section 110 in the axial direction is set to be approximately the same as the distance obtained by subtracting the length of the annular member 180 from the distance from the end surface 60a of the base section 60 of the main valve body 68 to the front end surface of the collar member 84.

Figure 4:
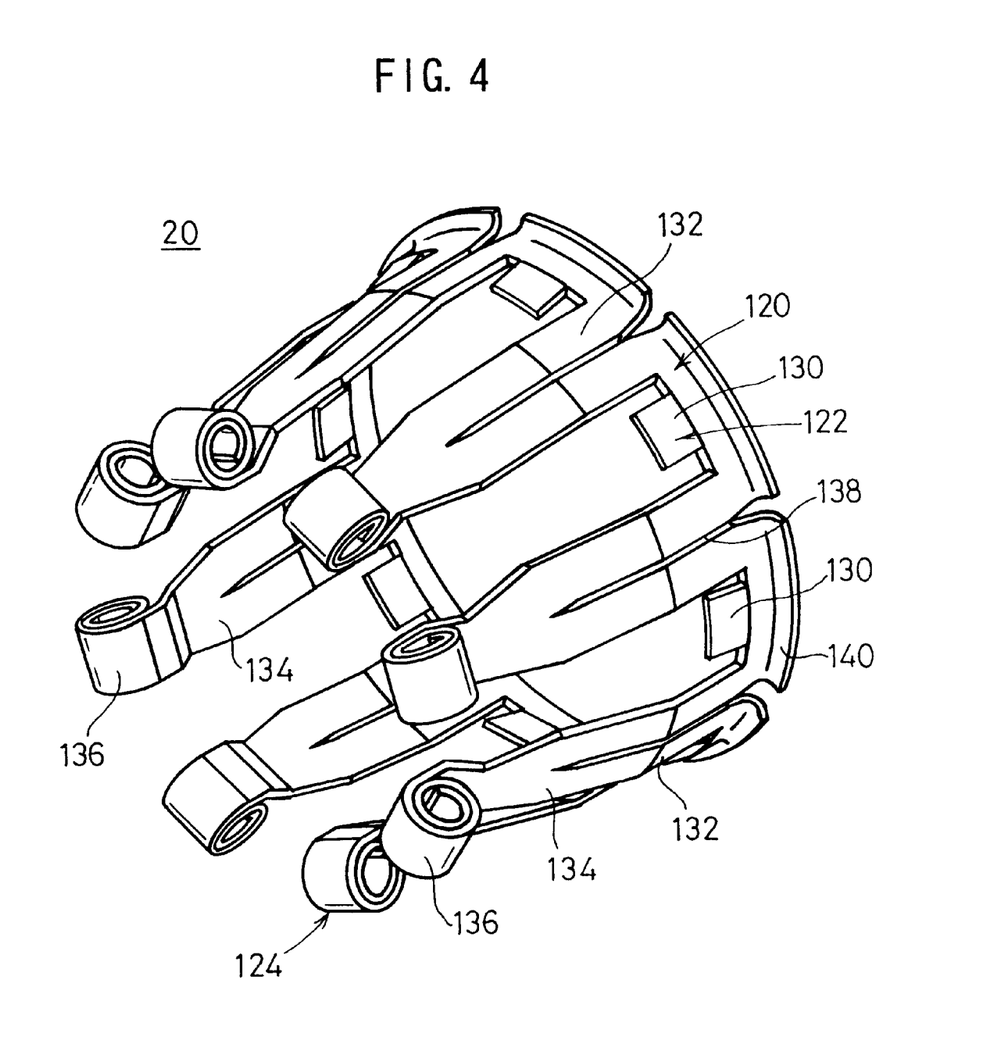
FIG. 4 is a perspective view illustrating an arrangement of a chuck according to the embodiment of the present invention.
Figure 5:
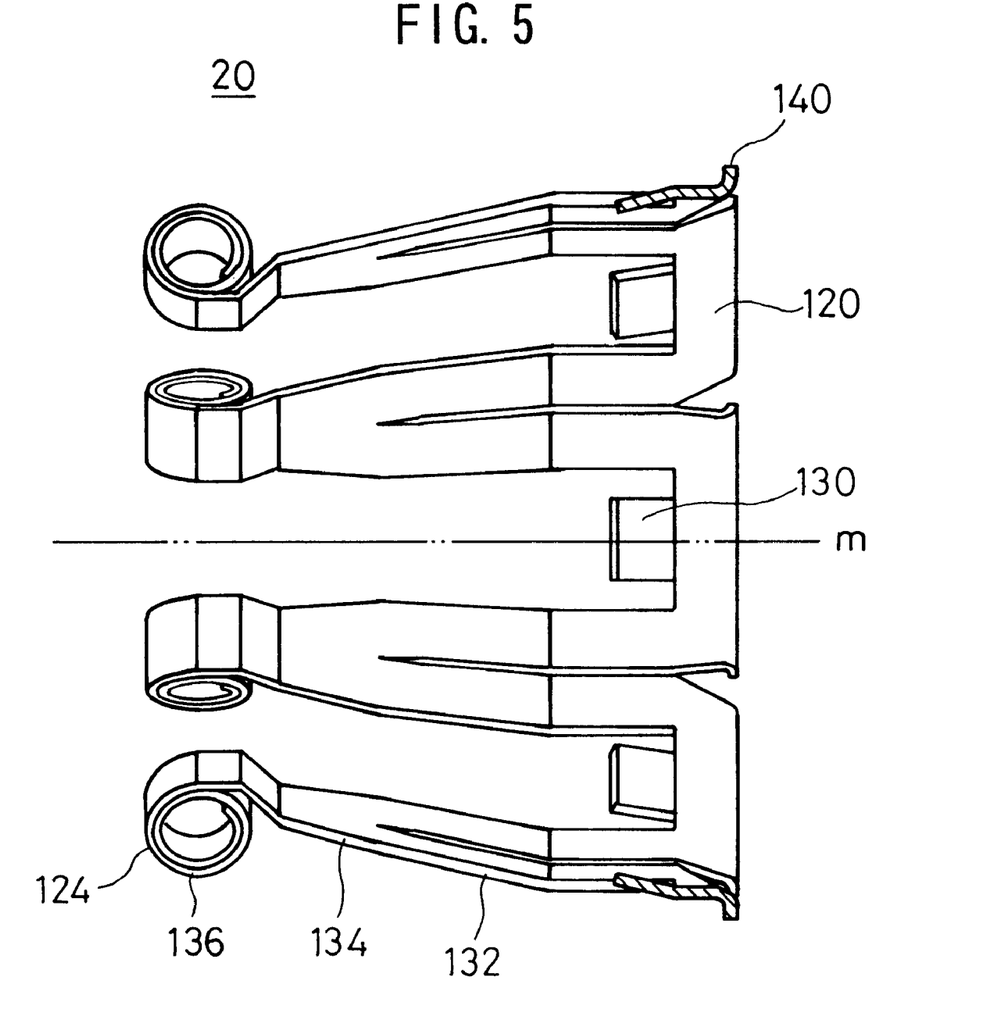
FIG. 5 is a longitudinal sectional view illustrating an arrangement of the chuck according to the embodiment of the present invention.

As shown in FIGS. 4 and 5, the chuck 20 is composed of metal or the like. The chuck 20 comprises a circular ring section 120 through which the first tube joint member 12 is inserted, first engaging sections 122 which extend from the circular ring section 120 along the central axis m (see FIG. 5) of the circular ring section 120 and which are engaged with the first tube joint member 12, and second engaging sections 124 which extend from the circular ring section 120 along the central axis m of the circular ring section 120 and which are elastically engaged with the second tube joint member 14.

Specifically, the circular ring section 120 has its inner diameter which is approximately the same as the outer diameter of the small outer diameter section 42 of the front section 36 of the first tube joint member 12. The circular ring section 120 is installed to a proximal portion of the small outer diameter section 42.

The first engaging sections 122 include a plurality of plate tabs 130 disposed on the circular ring section 120. The second engaging sections 124 include a plurality of plate spring sections 132 disposed on the circular ring section 120 and being lengthy as compared with the plate tabs 130 of the first engaging sections 122.

The plate tabs 130 of the first engaging sections 122 are provided at equal intervals on the circular ring section 120. The plate spring sections 132 of the second engaging sections 124 are provided at equal intervals on the circular ring section 120 at positions different from those of the plate tabs 130. FIG. 4 shows that eight of the plate tabs 130 are provided at equal intervals on the circular ring section 120 at positions of point symmetry with respect to the center of the circular ring section 120, and that eight of the plate spring sections 132 are provided at equal intervals at positions of point symmetry with respect to the center of the circular ring section 120.

Each of the plate spring sections 132 has an inclined section 134 which is inclined and directed in the direction toward the central axis m of the circular ring section 120. The forward end of the plate spring section 132 is a rolled section 136 of a roll shape. The rolled section 136 is formed by rolling and winding the plate spring section 132 outwardly in about two turns.

As shown in FIG. 2, when the second tube joint member 14 is inserted into the first tube joint member 12 with the chuck 20 being installed to the small outer diameter section 42 of the front section 36 of the first tube joint member 12, the rolled sections 136 are engaged with the annular groove 108 formed at the rear section 50 of the second tube joint member 14 under the resilient action of the plate spring sections 132.

Then, the plate tabs 130 of the first engaging sections 122 are engaged with the annular groove of the front section 36 of the first tube joint member 12, thereby fixing the chuck 20 to the first tube joint member 12.

A cutout 138 is formed from the end of the circular ring section 120 toward the plate spring section 132. The forward end of the cutout 138 arrives at a height of ⅔ of the height of the plate spring sections 132. The cutout 138 improves the flexibility of the plate spring section 132, thereby making it easier to elastically deforming the plate spring section 132.

The circular ring section 120 has a flange 140 at an end thereof. The flange 140 is formed by bending and deforming the end of the circular ring section 120 outwardly. As shown in FIG. 2, the first end of the compressive coil spring 18 abuts against the flange 140. The chuck 20 is more firmly fixed to the first tube joint member 12 by the abutment of the compressive coil spring 18.

The sleeve 16 has a hollow section 150 which makes penetration from the front end opening to the rear end opening. The hollow section 150 has a diameter of such a degree that the joining portion of the first tube joint member 12 and the second tube joint member 14 can be inserted through the hollow section 150.

A bent section 16c is integrally formed near the front end of the sleeve 16. The bent section 16c protrudes inwardly and is provided so that the rolled sections 136 of the chuck 20 installed to the first tube joint member 12 can be pressed in the axial direction of the second tube joint member 14. An engaging tab 204 partially bending inwardly and engaged with the holder 190 is integrally formed near the rear end of the sleeve 16.

The front end section 16d of the sleeve 16 is bent so that the front end section 16d can be round inwardly for the following reason. The handling can be convenient and the second tube joint member 14 can be smoothly inserted into the hollow section 150 of the sleeve 16 (correctly the hollow section 34 of the first tube joint member 12). In addition, the strength of the sleeve 16 is intended to be large. The second end of the compressive coil spring 18 abuts against the rear surface of the bent section 16c.

When the second tube joint member 14 is inserted into the first tube joint member 12, the sleeve 16 is constantly resiliently urged by the compressive coil spring 18 in the natural state thereof in the direction of separating from the first tube joint member 12 toward the second tube joint member 14. Then, the engaging tab 204 abuts against the rear side surface wall of a guide section 192 of the holder 190 as described later on. The rolled sections 136 of the chuck 20 are pressed inwardly toward the second tube joint member 14 by the bent section 16c disposed near the front end of the hollow section 150.

Further, the rear end of the second tube joint member 14 presses the base section 60 of the main valve body 68 in the rearward direction to thereby open the valve plug 48.

The first protecting member 160 is provided to cover at least the portion where the sleeve 16 can axially move within a range of T1 at the forward end thereof. The forward end of the sleeve 16 is in the direction of the joining portion of the first and second tube joint members 12, 14. The first protecting member 160 is substantially cylindrical. The inner diameter of the front section 162 of the inner wall of the first protecting member 160 is set to be approximately the same as the outer diameter of the front section 16a of the sleeve 16. The inner diameter of the rear section 164 of the inner wall of the first protecting member 160 is set to be approximately the same as the outer diameter of the central section 16b of the sleeve 16. An annular projection 166 is provided in the middle of the front section 162 and the rear section 164 of the inner wall of the first protecting member 160. The cross-sectional configuration of the annular projection 166 is substantially the same as the cross-sectional configuration of the recess of the bent section 16c of the sleeve 16.

The first protecting member 160 is inserted to cover the sleeve 16 over a range from the front end section 16d of the sleeve 16 to the bent section 16c. While being inserted, the annular projection 166 and the bent section 16c are engaged with each other and are not disengaged in error. The front end of the first protecting member 160 have a length sufficient to protrude by a predetermined length t frontwardly from the front end section 16d of the sleeve 16. The predetermined length t is set to be a dimension that does not cause interference between the size of the tube joint 10 and the second tube joint member 14.

The first protecting member 160 is formed of a relatively soft resilient member. Specifically, urethane rubber or fluoro rubber is preferably used.

The annular projection 166 may be a plurality of divided bulge-shaped projections instead of having the annular configuration. The frontward projection having the length t may be bent inwardly instead of protruding frontwardly.

Because the annular projection 166 and the bent section 16c are engaged with each other, the first protecting member 160 is engaged relatively tightly and is not disengaged in error when being usually used. Further, the first protecting member 160 is formed of the soft material such as urethane rubber to be removed without any special tool.

The first protecting member 160 covers the front of the sleeve 16 when it is inserted into the sleeve 16. Therefore, the first protecting member 160 functions as protecting the sleeve 16 from an external impact force and even the thin-walled sleeve 16 is not broken or deformed.

The front end section 16*d* of the sleeve 16 is not covered with the first protecting member 160. However, the front end section 16*d* is disposed at the depth of the predetermined length t. The front end section 16*d* is protected from the impact force.

Further, the second protecting member 170 in provided to cover at least the portion where the sleeve 16 can axially move within a range of T2 at the rear end thereof. The rear end of the sleeve 16 is opposite to the direction of the joining portion of the first and second tube joint members 12, 14. The second protecting member 170 is hollow and substantially cylindrical. The second protecting member 170 has a projection 174 protruding inwardly at a rear end thereof. The projection 174 has an inner diameter slightly smaller than the outer diameter of the proximal portion 38 of the first tube joint member 12. An inner wall section 172 disposed frontwardly from the projection 174 has its inner diameter slightly larger than the outer diameter of the rear end of the sleeve 16.

The projection 174 of the second protecting member 170 is inserted into the proximal section 38*a* of the proximal section 38 of the first tube joint member 12. The inner diameter of the projection 174 is slightly smaller than the outer diameter of the proximal section 38*a*. Therefore, the projection 174 is forcibly inserted by an apparatus of an exclusive use. When the projection 174 is forcibly inserted, the inner wall section 172 covers the rear end of the sleeve 16.

As a material of the second protecting member 170, it is desirable to use a resilient member having high shock resistance. Specifically, it is preferable to select a polybutylene terephthalate resin (hereinafter abbreviated as "PBT") resistive to the high shock.

The shock resistance may be evaluated with a criterion including values of Izod impact strength (JIS K 7110) and Charpy impact strength (JIS K 7111).

Preferably, the outer diameter of the second protecting member 170 is set to obtain a sufficient wall thickness in consideration of the size of the tube joint 10 and the required shock resistance.

Since the second protecting member 170 is formed as described above, the tube joint 10 can be protected principally from the impact force applied in the radial direction perpendicular to the axial direction of the tube joint 10.

Specifically, when the second protecting member 170 receives the impact force in the radial direction, then the impact force is mitigated by the shock resistance of the second protecting member 170, and the impact force is transmitted to the proximal section 38*a* of the first tube joint member 12. The first tube joint member 12 is composed of the metal material having an appropriate wall thickness and a sufficient strength. Accordingly, the first tube joint member 12 is neither broken nor deformed. Therefore, the impact force is not transmitted to the rear end of the sleeve 16, being safe even in the case of the thin-walled structure.

The second protecting member 170 is forcibly inserted into the proximal section 38*a* of the first tube joint member 12. Therefore, the second protecting member 170 is not rotated with respect to the first tube joint member 12. Therefore, the operation is conveniently performed even by gripping the outer circumference of the second protecting member 170. Since the axial movement does not occur, the compressive force is not applied to the holder 190 and the sleeve 16 as well.

It is not necessary to use the forcible insertion for tightly joining the second protecting member 170 and the first tube joint member 12. For example, an adhesive is preferably used and, alternatively, the second protecting member 170 and the first tube joint member 12 may be fastened with screws.

The outer diameter of the rear end of the sleeve 16 is set to be slightly smaller than the inner diameter of the inner wall section 172 of the second protecting member 170. Therefore, it is possible for the sleeve 16 to slide smoothly in the axial direction without contacting the inner wall section 172.

The cylindrical holder 190 is provided to coat the proximal section 38 of the large outer diameter in the front section 36 of the first tube joint member 12.

The holder 190 has an annular groove 194 into which the second end of the compressive coil spring 18 is fitted. The annular groove 194 is formed at the front end of the holder 190.

The front end of the holder 190 is expanded outwardly so that the outer diameter of the front end can be approximately the same as the inner diameter of the rear of the sleeve 16. Further, the front end of the holder 190 has a guide section 192 which contacts the inner wall of the sleeve 16. The guide section 192 extends frontwardly along the inner wall of the sleeve 16. Accordingly, the sleeve 16 can slide smoothly and stably in the frontward and rearward directions of the sleeve 16.

The inner diameter of the rear section 196 other than the guide section 192 of the holder 190 is set to be approximately the same as the outer diameter of the section 38*b* disposed frontwardly from the proximal section 38*a* of the proximal section 38 of the first tube joint member 12. The length of the rear section 196 is set to provide a gap between the holder 190 and the projection 174 of the second protecting member 170 with the holder 190 being inserted into the front section 38*b* of the first tube joint member 12.

As a material of the holder 190, it is desirable to use a resilient member resistive to the shock in the same manner as the second protecting member 170. Specifically, the material can be selected preferably from PBT. In this arrangement, the sleeve 16 is supported by the guide section 192 of the holder 190. Therefore, it is possible to protect this portion from the inner wall.

Stated otherwise, the front end of the sleeve 16 is protected by the first protecting member 160 and the rear end thereof is protected by the second protecting member 170. However, the middle of the sleeve 16 is exposed. The middle of the sleeve 16 is supported at the inner wall by the guide section 192 of the holder 190. Accordingly, even if the impact force is applied, it is mitigated by the shock resistance of the holder 190 and is transmitted to the front section 38*b* of the first tube joint member 12. The first tube joint member 12 is not deformed as described above.

The middle of the sleeve 16 is supported at the inner wall by the holder 190. Therefore, the middle thereof is not dented in the direction along with inner diameter. The compressive coil spring 18 and the chuck 20 are also protected without receiving the impact force.

As shown in FIG. 3, the gap is formed between the rear end surface of the guide section 192 of the holder 190 and the front end surface of the engaging tab 204 of the sleeve 16 if the second tube joint member 14 is not inserted into the first tube joint member 12 and if the sleeve 16 is displaced rearwardly. The gap corresponds to the relative movement distance between the first tube joint member 12 and the sleeve 16. Therefore, as shown in FIG. 2, when the second tube joint member 14 is inserted into the first tube joint member 12, the first tube joint member 12 is moved relatively rearwardly with respect to the sleeve 16, and the front end surface of the engaging tab 204 of the sleeve 16 abuts against the rear end surface of the guide section 192 of the holder 190.

The chuck 20 includes the base of the circular ring section 120, the first engaging sections 122 for engaging with the first tube joint member 12, and the second engaging sections 124 for resiliently engaging with the second tube joint member 14. These components are integrally arranged.

A method of using the tube joint 10 according to the present embodiment will now be explained briefly.

As shown in FIG. 3, the external force is applied to the sleeve 16 when the second tube joint member 14 is not inserted into the first tube joint member 12 so that the sleeve 16 can be displaced in the direction toward the rear of the first tube joint member 12. Accordingly, the rolled sections 136 of the chuck 20 are released from the pressing action of the sleeve 16.

Then, as shown in FIG. 2, the second tube joint member 14 is inserted until the rear end surface of the second tube joint member 14 abuts against the base section 60 of the main valve body 68 (see FIG. 1 or 3). Further, the second tube joint member 14 is pressed toward the first tube joint member 12. Accordingly, the collar member 84 and the main valve body 68 are displaced in the direction toward the rear of the first tube joint member 12. Then, the rolled sections 136 of the chuck 20 arrive at the annular groove 108 formed on the second tube joint member 14. The rolled sections 136 are engaged with the annular groove 108 by the resilience of the plate spring sections 132.

In addition, the base section 60 of the main valve body 68 is pressed in the direction toward the rear of the first tube joint member 12. The O-ring 76 disposed on the projection 66 of the main valve body 68 is separated from the movable member 72 and is located at a substantial center of the central section 30 (hexagonal cylinder-shaped portion) of the first tube joint member 12 to thereby open the valve plug 48.

Next, when the external force is eliminated from the sleeve 16, the sleeve 16 is displaced frontwardly under the resilient urging action of the compressive coil spring 18 until the front end of the engaging tab 204 of the sleeve 16 abuts against the rear end of the guide section 192 of the holder 190 of the lock mechanism 200. The rolled sections 136 of the chuck 20 are pressed in the axial direction of the second tube joint member 14 by the bent section 16c of the sleeve 16c. The rolled sections 136 are tightly engaged with the annular groove 108 under the pressing action. The rolled sections 136 consequently grip the second tube joint member 14. Accordingly, the second tube joint member 14 is firmly joined to the first tube joint member 12.

Inversely, when the second tube joint member 14 is disengaged from the first tube joint member 12, the external force is applied to the sleeve 16 to displace the sleeve 16 in the direction toward the rear of the first tube joint member 12. Accordingly, the rolled sections 136 of the chuck 20 are released from the pressing action of the sleeve 16. At this time, the collar member 84 and the main valve body 68 are resiliently urged by the compressive coil spring 70. The O-ring 76 disposed on the projection 66 of the main valve body 68 abuts against the movable member 72 again. Accordingly, the gap between the main valve body 68 and the movable member 72 is sealed to thereby close the valve plug 48.

In the tube joint 10 according to the embodiment of the present invention, the forward end of the sleeve 16 can be protected from the external impact force by the first protecting member 160. Further, the first protecting member 160 is formed of the soft resilient member such as urethane rubber. Therefore, the first protecting member 160 is detachable without any special tool.

Further, the tube joint 10 can be protected from the impact force applied in the radial direction perpendicular to the axial direction of the tube joint 10 by the second protecting member 170 formed of the resilient member having the shock resistance. The second protecting member 170 is forcibly inserted into the proximal section 38a of the first tube joint member 12. Accordingly, the second protecting member 170 is not rotated with respect to the first tube joint member 12 and does not move axially. Therefore, the operation is conveniently performed even by gripping the outer circumference of the second protecting member 170. The compressive force is not applied to the holder 190 and the sleeve 16.

Further, the middle of the sleeve 16 is supported at the inner wall by the holder 190 formed of the resilient member resistive to the shock. Therefore, the middle thereof is not dented in the inner diameter direction. The compressive coil spring 18 and the chuck 20 are also protected without receiving any impact force.

In the above embodiment, the second tube joint member 14 may be disengaged if the sleeve 16 is carelessly moved with the first tube joint member 12 and the second tube joint member 14 being joined to one another. Accordingly, an appropriate lock mechanism is provided to avoid unwanted displacement of the sleeve 16 in the rearward direction after the first tube joint member 12 and the second tube joint member 14 are joined to one another.

It is a matter of course that the tube joint according to the present invention is not limited to the above embodiment, which may be embodied in other various forms without deviating from the gist or essential characteristics of the present invention.

What is claimed is:

1. A tube joint comprising:

a first tube joint member;

a second tube joint member joined to said first tube joint member;

a sleeve member attached to a joining portion of said first and second tube joint members, for joining and releasing said first and second tube joint members, said sleeve member being axially movable relative to said first tube joint member;

a resilient member for urging said sleeve member in a direction to join said first and second tube joint members to one another;

a first protecting member for protecting at least said sleeve member, said first protecting member being positioned over and covering a forward end of said sleeve member, said forward end being in a direction of said joining portion of said first and second tube joint members, wherein said forward end of said sleeve member does not project beyond a forward end of said first protecting member, and said first protecting member is movable in unison with said sleeve member; and a second protecting member connected to said first tube joint member for protecting said sleeve member located at a position on said sleeve member different from said first protecting member.

2. The tube joint according to claim 1, wherein said first protecting member is disposed at least at a portion where said sleeve member can axially move within a range of T1 at said forward end thereof.

3. The tube joint according to claim 2, further comprising an engagement section for engaging with said first protecting member, said engagement section being disposed at said forward end of said sleeve member.

4. The tube joint according to claim 1, wherein said second protecting member is disposed at least at a portion where said sleeve member can axially move within a range of T2 at a rear end thereof, said rear end of said sleeve member being opposite to the direction of said joining portion of said first and second tube joint members.

5. The tube joint according to claim 1, wherein said first and second protecting members are disposed at least at portions where said sleeve member can axially move within respective ranges of T1, T2 at both of said forward end and a rear end of said sleeve member, said rear end being opposite to said forward end.

6. The tube joint according to claim 5, further comprising an engagement section for engaging with said first protecting member, said engagement section being disposed at said forward end of said sleeve member.

7. The tube joint according to claim 6, wherein said engagement section is a recess.

8. The tube joint according to claim 2, wherein said first protecting member is formed of urethane rubber or fluoro rubber.

9. The tube joint according to claim 2, wherein said first protecting member is detachable by elastically deforming.

10. The tube joint according to claim 2, wherein said first protecting member is of a shape protruding frontwardly from said forward end of said sleeve member.

11. The tube joint according to claim 4, wherein said second protecting member is formed of polybutylene terephthalate resin.

12. The tube joint according to claim 4, wherein said second protecting member and said first tube joint member are joined to one another at a circumferential surface, an inner diameter of said second protecting member at said circumferential surface is set to be smaller than an outer diameter of said first tube joint member, and said second protecting member is forcibly inserted into said first tube joint member.

13. The tube joint according to claim 1, wherein a valve plug is disposed in said first tube joint member, and said valve plug is opened to make communication between a front and a rear of said first tube joint member when said second tube joint member is inserted into said first tube joint member, or said valve plug is closed if said second tube joint member is not inserted into said first tube joint member.

* * * * *